(12) United States Patent
Kumar et al.

(10) Patent No.: US 8,111,752 B2
(45) Date of Patent: Feb. 7, 2012

(54) ENCODING MODE PRUNING DURING VIDEO ENCODING

(75) Inventors: Roger Kumar, San Francisco, CA (US); Thomas Pun, San Jose, CA (US); Hsi Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1755 days.

(21) Appl. No.: 11/119,428

(22) Filed: Apr. 28, 2005

(65) Prior Publication Data

US 2005/0286635 A1 Dec. 29, 2005

Related U.S. Application Data

(60) Provisional application No. 60/583,447, filed on Jun. 27, 2004, provisional application No. 60/643,917, filed on Jan. 9, 2005.

(51) Int. Cl.
*H04N 7/12* (2006.01)
(52) U.S. Cl. .................................. 375/240.16
(58) Field of Classification Search .............. 375/240.16
See application file for complete search history.

(56) References Cited

U.S. PATENT DOCUMENTS

| 5,060,285 A | 10/1991 | Dixit et al. |
| 5,200,820 A | 4/1993 | Gharavi |
| 5,488,419 A | 1/1996 | Hui et al. |
| 5,508,744 A * | 4/1996 | Savatier .................. 375/240.16 |
| 5,576,767 A | 11/1996 | Lee et al. |
| 5,696,698 A | 12/1997 | Herluison et al. |
| 5,706,059 A | 1/1998 | Ran et al. |
| 5,731,850 A | 3/1998 | Maturi et al. |
| 5,757,668 A | 5/1998 | Zhu |
| 5,808,626 A | 9/1998 | Givens et al. |
| 5,872,604 A | 2/1999 | Ogura |
| 5,929,940 A | 7/1999 | Jeannin |

(Continued)

FOREIGN PATENT DOCUMENTS

EP 1 610 561 12/2005

(Continued)

OTHER PUBLICATIONS

W. Choi, J. Lee, S. Yang, B. Jeon, "Fast motion estimation and mode decision with variable motion block sizes", Visual Comm & Image Processing, 2003.*

(Continued)

*Primary Examiner* — Jay Au Patel
*Assistant Examiner* — Richard Torrente
(74) *Attorney, Agent, or Firm* — Adeli & Tollen LLP

(57) ABSTRACT

A method for encoding a first set of pixels in a first image in a sequence of images is described. From a set of encoding modes, the method selects a first mode for encoding the first set of pixels. The method then determines whether encoding the first set of pixels in the first mode satisfies a set of quality criteria. The method foregoes encoding the first set of pixels in a second mode from the set of encoding modes, when the first mode encoding satisfies the set of quality criteria. The method also provides a video encoding method that examines several different methods for encoding a set of pixels in a first image. From a list of possible encoding modes, the method eliminates a set of encoding modes that are not likely to provide a suitable encoding solution. The method then examines different encoding solutions based on the remaining encoding modes in the list.

26 Claims, 14 Drawing Sheets

U.S. PATENT DOCUMENTS

| | | | |
|---|---|---|---|
| 6,014,181 | A | 1/2000 | Sun |
| 6,081,209 | A | 6/2000 | Schuyler et al. |
| 6,128,047 | A | 10/2000 | Chang et al. |
| 6,192,081 | B1 | 2/2001 | Chiang et al. |
| 6,212,237 | B1 | 4/2001 | Minami et al. |
| 6,283,717 | B1 | 9/2001 | Yamada |
| 6,289,050 | B1 | 9/2001 | Ohtani et al. |
| 6,363,117 | B1 | 3/2002 | Kok |
| 6,380,986 | B1 | 4/2002 | Minami et al. |
| 6,462,791 | B1* | 10/2002 | Zhu ................... 375/240.27 |
| 6,483,876 | B1 | 11/2002 | Chang et al. |
| 6,498,815 | B2 | 12/2002 | Kleihorst et al. |
| 6,529,634 | B1 | 3/2003 | Thyagarajan et al. |
| 6,567,469 | B1 | 5/2003 | Rackett |
| 6,584,155 | B2 | 6/2003 | Takeda et al. |
| 6,646,578 | B1 | 11/2003 | Au |
| 6,668,020 | B2 | 12/2003 | Ma et al. |
| 6,842,483 | B1 | 1/2005 | Au et al. |
| 6,876,703 | B2 | 4/2005 | Ismaeil et al. |
| 6,895,361 | B2 | 5/2005 | Yang |
| 6,947,603 | B2 | 9/2005 | Kim |
| 7,177,359 | B2 | 2/2007 | Song et al. |
| 7,239,721 | B1 | 7/2007 | Kumar et al. |
| 7,260,148 | B2* | 8/2007 | Sohm ................... 375/240.16 |
| 7,412,080 | B2 | 8/2008 | Kumar et al. |
| 7,555,043 | B2 | 6/2009 | Sato et al. |
| 7,646,437 | B1* | 1/2010 | Dumitras et al. ........ 348/700 |
| 7,742,525 | B1 | 6/2010 | Kumar et al. |
| 7,792,188 | B2 | 9/2010 | Tong et al. |
| 2001/0008545 | A1 | 7/2001 | Takeda et al. |
| 2001/0019586 | A1 | 9/2001 | Kang et al. |
| 2002/0025001 | A1 | 2/2002 | Ismaeil et al. |
| 2002/0131500 | A1 | 9/2002 | Gandhi et al. |
| 2003/0202594 | A1* | 10/2003 | Lainema ................ 375/240.16 |
| 2003/0206594 | A1 | 11/2003 | Zhou |
| 2004/0057515 | A1* | 3/2004 | Koto et al. .............. 375/240.14 |
| 2004/0151381 | A1 | 8/2004 | Porter et al. |
| 2004/0165662 | A1 | 8/2004 | Battistella |
| 2005/0117647 | A1 | 6/2005 | Han |
| 2005/0135484 | A1* | 6/2005 | Lee et al. ............... 375/240.16 |
| 2005/0179572 | A1* | 8/2005 | Winger .................. 341/107 |
| 2005/0249277 | A1 | 11/2005 | Ratakonda et al. |
| 2005/0286630 | A1 | 12/2005 | Tong et al. |
| 2005/0286777 | A1 | 12/2005 | Kumar et al. |
| 2010/0290526 | A1 | 11/2010 | Tong et al. |
| 2011/0019879 | A1 | 1/2011 | Kumar et al. |

FOREIGN PATENT DOCUMENTS

| | | |
|---|---|---|
| EP | 1 610 563 | 12/2005 |
| GB | 2348559 | 10/2000 |
| JP | 8-56362 | 2/1996 |
| JP | 11-328369 | 11/1999 |
| JP | 2001-251632 | 9/2001 |
| JP | 2004-7337 | 1/2004 |
| WO | WO 2006/004667 | 9/2007 |

OTHER PUBLICATIONS

Non-Final Office Action, of U.S. Appl. No. 10/427,891, mailing date Sep. 25, 2006, Kumar, Roger, et al.

Notice of Allowance of U.S. Appl. No. 10/427,891, mailing date Feb. 8, 2007, Kumar, Roger, et al.

Non-Final Office Action of U.S. Appl. No. 11/751,552, filed Nov. 30, 2007, Kumar, Roger, et al.

Notice of Allowance of U.S. Appl. No. 11/751,552, filed May 20, 2008, Kumar, Roger, et al.

U.S. Appl. No. 10/427,890, filed Apr. 30, 2003, Kumar, Roger, et al.

Non-Final Office Action of U.S. Appl. No. 10/427,890, mailing date Apr. 12, 2006, Kumar, Roger, et al.

Final Office Action for U.S. Appl. No. 10/427,890, mailing date Oct. 27, 2006, Kumar, Roger, et al.

Advisory Action for U.S. Appl. No. 10/427,890, mailing date Jan. 25, 2007, Kumar, Roger, et al.

Non-Final Office Action for U.S. Appl. No. 10/427,890, mailing date May 29, 2007, Kumar, Roger, et al.

Final Office Action of U.S. Appl. No. 10/427,890, mailing date Dec. 18, 2007, Kumar, Roger, et al.

International Search Report for PCT/US2005/022743, mailing date May 21, 2007, Apple Computer, Inc.

International Preliminary Report on Patentability for PCT/US2005/022743, mailing date Jun. 28, 2007, Apple Computer Inc.

Turaga, et al. "Search algorithms for block-matching in motion estimation", pp. 1-14, Apr. 1998.

Updated portions of prosecution history of U.S. Appl. No. 10/427,891, filed Apr. 20, 2007, Kumar, Roger, et al.

Updated portions of prosecution history of U.S. Appl. No. 11/751,552, filed Jul. 2, 2008, Kumar, Roger, et al.

Updated portions of prosecution history of U.S. Appl. No. 10/427,890, filed Apr. 14, 2010, Kumar, Roger, et al.

Portions of prosecution history of U.S. Appl. No. 11/119,414, filed May 28, 2010, Kumar, Roger, et al.

Portions of prosecution history U.S. Appl. No. 11/070,778, filed Apr. 15, 2010, Tong, Xin, et al.

Updated portions of prosecution history of U.S. Appl. No. 10/427,891, filed Apr. 30, 2007, Kumar, Roger, et al.

Updated portions of prosecution history of U.S. Appl. No. 11/751,552, filed Jul. 11, 2008, Kumar, Roger, et al.

Updated portions of prosecution history of U.S. Appl. No. 10/427,890, filed Apr. 29, 2010, Kumar, Roger, et al.

Portions of prosecution history of U.S. Appl. No. 12/772,971, filed Oct. 13, 2010, Kumar, Roger, et al.

Updated portions of prosecution history of U.S. Appl. No. 11/119,414, filed Nov. 8, 2010, Kumar, Roger, et al.

Updated portions of prosecution history of U.S. Appl. No. 11/070,778, filed Jul. 27, 2010, Tong, Xin, et al.

Portions of prosecution history of U.S. Appl. No. 12/843,840, filed Jan. 3, 2011, Tong, Xin, et al.

Portions of prosecution history of EP05291379.5, mailing date Jun. 21, 2010, Apple Inc.

Portions of prosecution history of EP05291381.1, mailing date Jun. 25, 2010, Apple Inc.

Author Unknown, "Test Model 5 Edition—International Organization for Standardization = Organisation Internationale de Normalisation," Apr. 7, 1993, pp. 1-119, Revision 2.

Clarke, R.J., et al., "Digital Compression of Still Images and Video, Other Intraframe Techniques. 2: Quadtree, Multiresolution and Neural Approaches," Jan. 1, 1995, pp. 195-205, Academic Press, London, UK.

Keissarian, F., "New Quadtree Predictive Image Coding Technique Using Pattern-Based Classification," Visual Communications and Image Processing, Jul. 8, 2003, pp. 1481-1490, vol. 5150.

Strobach, P., "Tree-Structured Scene Adaptive Coder," IEEE Transactions on Communications, Apr. 1, 1990, vol. 38, No. IEEE Serivce Center, Piscataway, New Jersey.

Sullivan, G. J., et al. "Efficient Quadtree Coding of Images and Video," International Conference on Acoustics, Speech & Signal Processing, Toronto, Apr. 4, 1991, pp. 2661-2664, vol. CONF. 16, IEEE Transactions on Communications, New York.

Tanizawa, A., et al."A Study on Fast Rate-Distortion Optimized Coding Mode Decision for H.264," 2004 International Conference on Image Processing (ICIP), Oct. 24-27, 2004, pp. 793-796, vol. 2, IEEE.

Wang, Y., et al., "A Motion Vector Search Algorithm Based on a Simple Search-Block Interpolation Scheme," IEICE Transactions on Communications, Feb. 1, 2004, pp. 384-389, vol. E87B, No. 2, Communications Society, Tokyo, Japan.

Wiegand, T., et al., "Entropy-Constrained Design of Quadtree Video Coding Schemes," Sixth International Conference on Image Processing and its Applications, Jul. 14, 1997, pp. 36-40, vol. 1, IEE, Dublin, UK.

\* cited by examiner

ENCODING MODE PRUNING DURING VIDEO ENCODING

CLAIM OF BENEFIT

This application claims benefit of U.S. Provisional patent application entitled "Encoding and Decoding Video" filed Jun. 27, 2004 and having Ser. No. 60/583,447. This application claims benefit of U.S. Provisional patent application entitled "Method for Performing Motion Estimation for Encoding Images" filed Jan. 9, 2005 and having Ser. No. 60/643,917. These applications are incorporated herein by reference.

FIELD OF THE INVENTION

The present invention is directed towards a method for encoding and decoding images.

BACKGROUND OF THE INVENTION

Video codecs are compression algorithms designed to encode (i.e., compress) and decode (i.e., decompress) video data streams to reduce the size of the streams for faster transmission and smaller storage space. While lossy, current video codecs attempt to maintain video quality while compressing the binary data of a video stream.

A video stream typically is formed by a sequence of video frames. Video encoders often divide each frame into several macroblocks, with each macroblock being a set of 16×16 pixels. During an encoding process, a typical encoder examines several possible encoding modes (e.g., intrablock, interblock, etc.) for each frame and/or each macroblock in the frame. After examining several possible encoding modes, the encoder then selects an encoding mode for each frame and/or macroblock.

Encoding is very time consuming given that the encoder must examine many macroblocks and encoding modes. Therefore, there is a need in the art for a more efficient encoding process. Ideally, such an encoding process would forego the examination of some of the encoding modes, while still providing superior video encoding.

SUMMARY OF THE INVENTION

Some embodiments provide a method for encoding a first set of pixels in a first image in a sequence of images. From a set of encoding modes, the method of some embodiments selects a first mode for encoding the first set of pixels. The method then determines whether encoding the first set of pixels in the first mode satisfies a set of quality criteria. The method foregoes encoding the first set of pixels in a second mode from the set of encoding modes, when the first mode encoding satisfies the set of quality criteria.

Some embodiments provide a video encoding method that examines several different methods for encoding a set of pixels in a first image. From a list of possible encoding modes, the method eliminates a set of encoding modes that are not likely to provide a suitable encoding solution. The method then examines different encoding solutions based on the remaining encoding modes in the list.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following detailed description of the invention, numerous details, examples and embodiments of the invention are set forth and described. However, it will be clear and apparent to one skilled in the art that the invention is not limited to the embodiments set forth and that the invention may be practiced without some of the specific details and examples discussed.

Some embodiments provide a method for encoding a first set of pixels in a first image in a sequence of images. From a set of encoding modes, the method of some embodiments selects a first mode for encoding the first set of pixels. The method then determines whether encoding the first set of pixels in the first mode satisfies a set of quality criteria. The method foregoes encoding the first set of pixels in a second mode from the set of encoding modes, when the first mode encoding satisfies the set of quality criteria.

Some embodiments provide a video encoding method that examines several different methods for encoding a set of pixels in a first image. From a list of possible encoding modes, the method eliminates (i.e., prunes) a set of encoding modes that are not likely to provide a suitable encoding solution. The method then examines different encoding solutions based on the remaining encoding modes in the list.

I. Overall Flow of Some Embodiments

Figure 1:
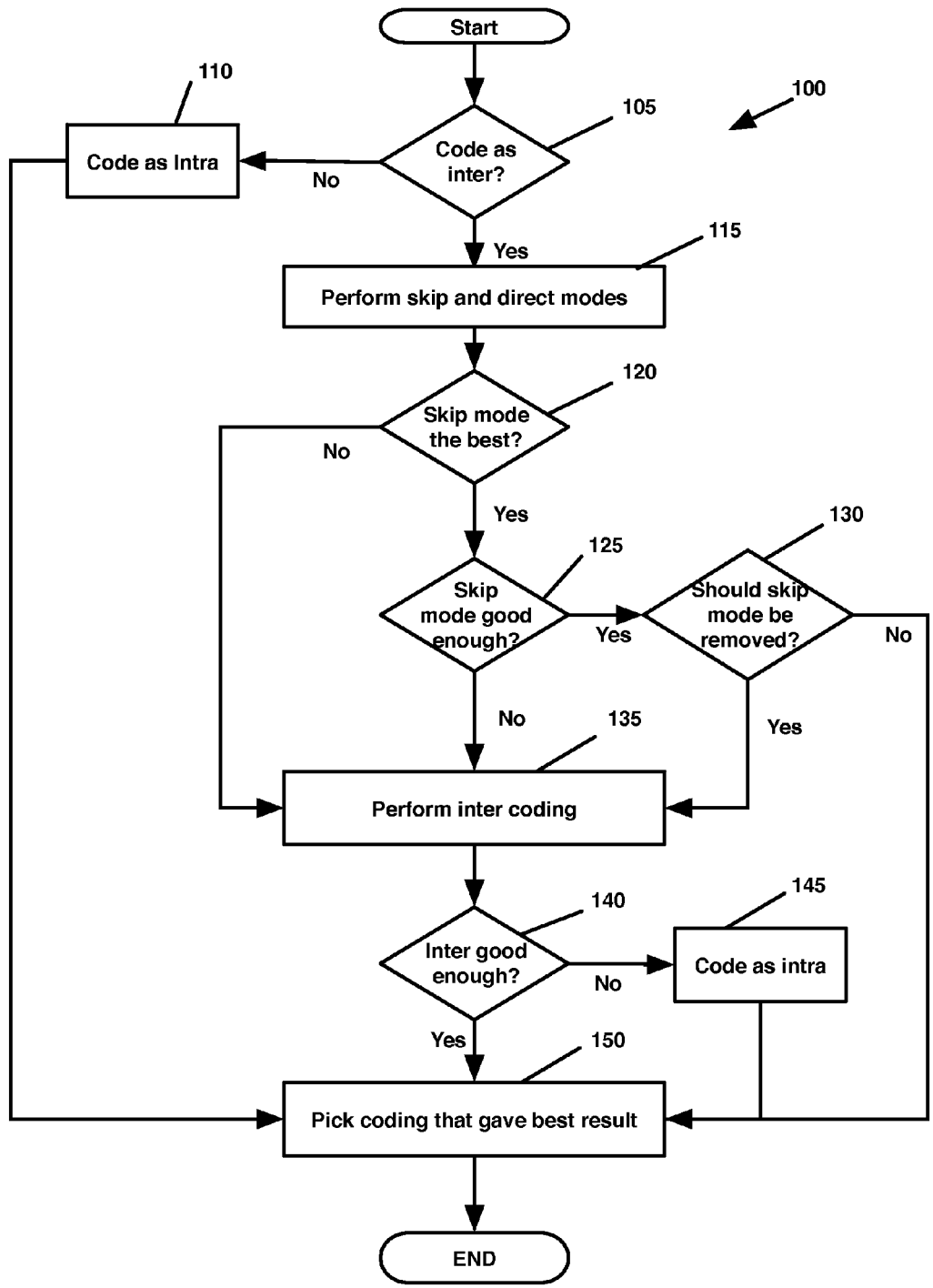
FIG. 1 presents a process that conceptually illustrates the flow of an encoder that uses various novel pruning techniques to simplify its encoding process.

FIG. 1 presents a process 100 of some embodiments for encoding a macroblock. This process conceptually illustrates the flow of operations of an encoder that uses various novel pruning techniques to simplify its encoding process. Before this process starts, some embodiments have already performed a coarse, first-stage motion estimation and have identified motion vectors for the macroblocks in the current frame (i.e., the frame that contains the macroblock that is being encoded by the process 100). This coarse motion estimation is described in U.S. patent application Ser. No. 11/119,414 entitled "Encoding and Decoding Images" filed concurrently with this application. This United States Patent Application, now published as U.S. Patent Publication 2005/0286777, is herein incorporated by reference.

As shown in FIG. 1, the process 100 starts by determining (at 105) whether to forego encoding the macroblock as an interblock. In some embodiments, the process foregoes interblock encoding under certain circumstances. These circumstances include the placement of the encoder in a debugging mode that requires coding each frame as an intrablock, the designation of an intrablock refresh that requires coding several macroblocks as intrablocks, the realization that intrablock encoding will be chosen at the end, the realization that too few macroblocks have been intrablock encoded, or some other designation that requires the macroblock to be coded as an intrablock.

If the process 100 determines (at 105) that it does not need to encode the macroblock as an interblock, it transitions to 110. At 110, the process encodes the macroblock as an intrablock. Various novel schemes for performing the intrablock encoding are described in U.S. patent application Ser. No. 11/070,778 entitled "Selecting Encoding Types and Predictive Modes for Encoding Video Data," filed Mar. 1, 2005, now issued as U.S. Pat. No. 7,792,188. This United States Patent Application, now issued as U.S. Pat. No. 7,792, 188, is herein incorporated by reference.

Once the process encodes (at 110) the macroblock as an intrablock, it transitions to 150 to designate the encoding solution. In this instance, the process designates the result of its intracoding at 110, as this is the only encoding that the process 100 has explored in this path through the flow. After 150, the process 100 ends.

Alternatively, if the process 100 determines (at 105) that it should not forego (i.e., prune) the interblock encoding, the process performs (at 115) a "skip mode" encoding of the macroblock, and, if necessary, a "direct mode" encoding of the macroblock. In skip mode encoding, the macroblock is coded as a skipped macroblock. This means that on the decoder side, this macroblock will be decoded by reference to the motion vectors of the surrounding macroblocks and/or partitions within the surrounding macroblocks. Skip mode encoding will be further described below. Direct mode encoding is similar to skip mode encoding, except that in direct mode encoding some of the macroblock's texture data is quantized and sent along in the encoded bit stream. In some embodiments, direct mode encoding is done for B-mode encoding of the macroblock. Some embodiments might also perform direct mode encoding during P-mode encoding.

After 115, the process 100 determines (at 120) whether the skip mode encoding resulted in the best encoding solution at 115. This would clearly be the case when no direct mode encoding is performed at 115. On the other hand, when direct mode encoding is performed at 115, and this encoding resulted in a better solution than the skip mode encoding, then the process transitions to 135 to perform interblock encoding, which will be described below.

However, when the process determines (at 120) that the skip mode encoding resulted in the best result at 115, the process determines (at 125) whether the skip mode encoding was sufficiently good to terminate the encoding. This determination (at 125) will be further described below by reference to FIG. 2.

If the process determines (at 125) that the skip mode encoding was good enough, the process 100 transitions to 130, where it determines whether the skip mode encoding solution should be discarded. Some embodiments judge solutions based on an encoding cost, called the rate-distortion cost (RD cost). The RD cost of an encoding solution often accounts for the distortion in the encoded macroblock and counts the actual bits that would be generated for the encoding solution. The computation of RD cost is further described in the above-incorporated U.S. patent application Ser. No. 11/119,414, entitled "Encoding and Decoding Images", now published as U.S. Patent Publication 2005/0286777. Skip mode solutions can sometimes have great RD costs but still be terrible solutions. This is because such solutions have very small rate costs, and such rate costs at times skew the total RD costs by a sufficient magnitude to make a poor solution appear as the best solution.

Accordingly, even after selecting a skip mode encoding solution at 125, the process 100 determines (at 125) whether it should remove the skip mode solution. In some embodiments, the criterion for making this decision is whether the distortion for the skip-mode encoding of the current macroblock is greater than two times the maximum distortion of the adjacent neighboring macroblocks of the current macroblock.

If the process determines (at 130) that the skip-mode solution should not be removed, it transitions to 150 to designate the encoding solution. In this instance, the process designates the result of skip-mode encoding. After 150, the process 100 ends. On the other hand, when the process determines (at 130) that the skip-mode encoding solution should be removed, it transitions to 135. The process also transitions to 135 when it determines (at 125) that the skip mode solution is not sufficiently good enough to terminate the encoding.

At 135, the process examines various interblock encodings. The interblock encoding process of some embodiments is a multi-stage process that includes the above-mentioned coarse motion estimation operation, followed by a refined, variable block size motion estimation. This multi-stage process is further described in the above-incorporated U.S. patent application Ser. No. 11/119,414, entitled "Encoding and Decoding Images", now published as U.S. Patent Publication 2005/0286777. In some embodiments, the interblock encoding process might explore various macroblock and sub-macroblock encodings (e.g., 16.times.16, 8.times.16, 16.times.8, 8.times.8, 8.times.4, 4.times.8, and 4.times.4 B-mode and P-mode encodings). However, as further described below, some embodiments speed up the interblock encoding process by pruning (i.e., foregoing) the exploration and/or analysis of some of the macroblock or sub-macroblock encoding modes.

After performing the interblock encoding at 135, the process determines (at 140) whether the interblock encoding of the macroblock is good enough for it to forego the intrablock encoding of the macroblock. Different embodiments make this decision differently. Some of these approaches will be further described below.

If the process 100 determines (at 140) that the intrablock encoding should be performed, then it transitions to 145, where it performs this encoding. As mentioned above, several novel features of this process' intrablock encoding are described in the above-incorporated U.S. patent application Ser. No. 11/070,778, entitled "Selecting Encoding Types and Predictive Modes for Encoding Video Data", now issued as U.S. Pat. No. 7,792,188. After 145, the process transitions to 150. The process also transitions to 150 when it determines (at 140) that it should forego the intrablock encoding.

As mentioned above, the process designates (at 150) the encoding solution for the macroblock. When the process 100 identifies multiple encoding solutions during its operations prior to 150, the process picks (at 150) one of these solutions. In some embodiments, the process 100 picks the solution that has the best RD cost. After 150, the process ends.

II. Coded Pruning

Figure 2:
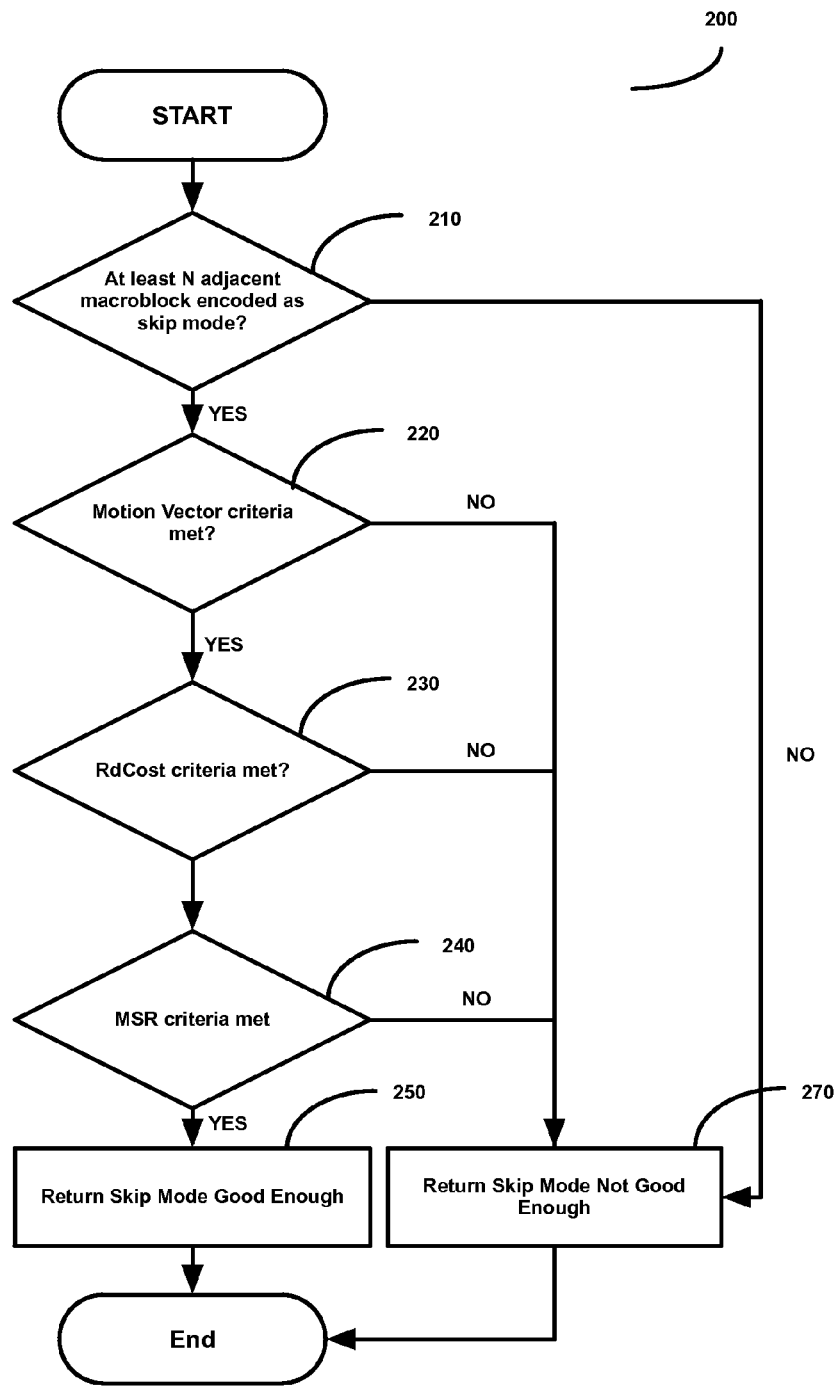
FIG. 2 illustrates a process that determines whether the skip-mode encoding solution identified is sufficiently good so that the encoding process could forego considering the interblock and intrablock encodings.

At 125, the process 100 determines whether the skip-mode encoding solution identified at 115 is sufficiently good so that the encoding process could forego considering the interblock and intrablock encodings. FIG. 2 illustrates a process 200 that makes this determination. Before this process starts, some embodiments have already performed the coarse, first-stage motion estimation and have identified motion vectors for the current macroblock and its adjacent neighbors in the current frame. Also, by the time the encoder is encoding the current macroblock, it has already performed the more refined, second stage encoding of the adjacent neighboring macroblocks of the current macroblock.

Figure 3:
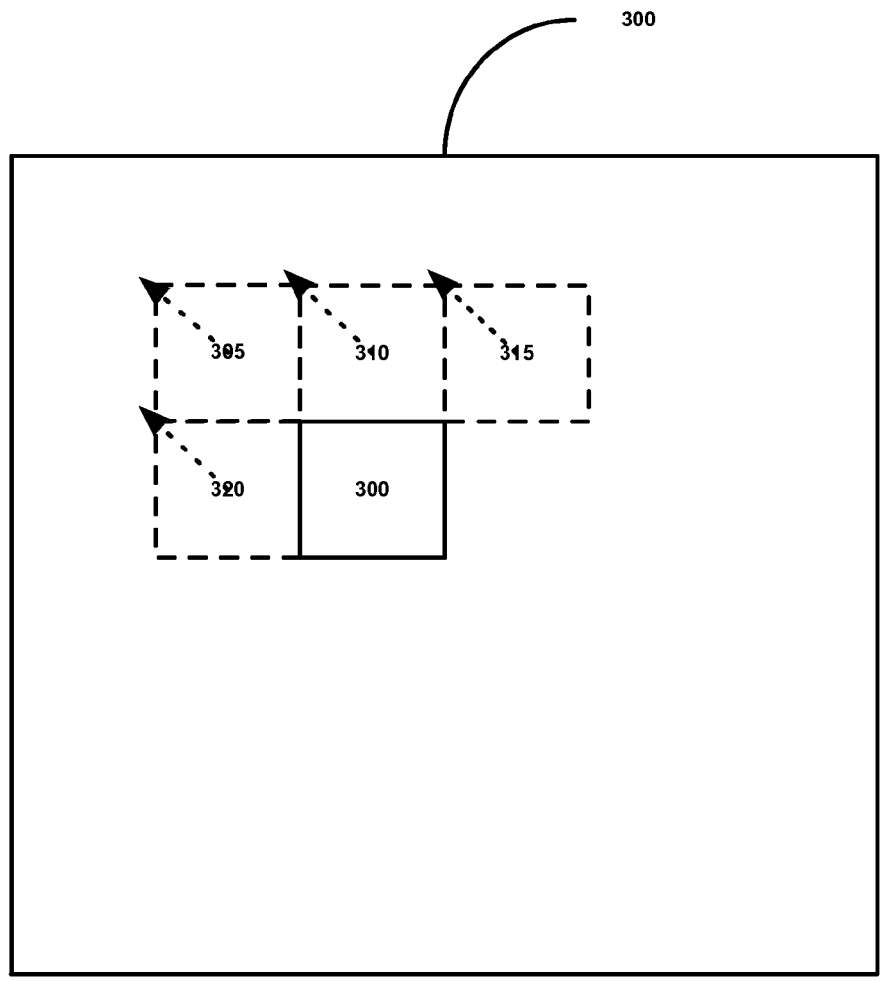
FIG. 3 illustrates an example of a current macroblock and several of this macroblock's adjacent neighbors.

FIG. 3 illustrates an example of a current macroblock 300 and several of this macroblock's adjacent neighbors 305-320. It also illustrates the motion vectors that were identified for the adjacent neighboring macroblocks 305-320 during the more refined second motion estimation stage.

As shown in FIG. 2, the process 200 initially determines (at 210) whether at least n macroblocks that are adjacent neighbors of the current macroblock in the current frame are skip-mode encoded. In some embodiments, n is one, while it is a number greater than one in other embodiments. When n is smaller than the number of adjacent neighboring macroblocks that are skip mode encoded, the process 200 might be performed several times. In each iteration of the process, a different subset of the neighboring macroblocks might be examined, where each subset has n skip-encoded, adjacent neighboring macroblocks. Hence, all these iterations are performed to determine whether any of the subsets has a set of statistics that matches the current macroblock.

When n adjacent neighboring macroblocks are not skip-mode encoded, the process returns (at 270) an indication that the skip mode encoding is not sufficiently good enough to terminate the encoding, and then terminates. However, when n adjacent neighboring macroblocks are skip-mode encoded, the process determines (at 220) whether the current macroblock's motion vector satisfies two criteria. The first criterion is that the current macroblock's motion vector has to point to the same reference frame as the set of adjacent neighboring macroblocks identified at 210.

The second criterion requires that the current macroblock's coarse motion vector be within a certain threshold of the coarse motion vectors for the set of the adjacent, neighboring macroblocks that were identified at 210. Specifically, the direction of the current macroblock's coarse motion vector has to be within a certain angular threshold of the directions of the identified neighboring macroblock's coarse motion vectors. Also, the length of the current macroblock's coarse motion vector has to be within a certain size threshold/percentage of the lengths of the identified neighboring macroblock's coarse motion vectors. The coarse motion vectors were identified for the macroblock of the current frame during a coarse, first stage search for each of these macroblocks.

If the process determines (at 220) that the current macroblock's coarse motion vector does not satisfy the two criteria mentioned above, the process returns (at 270) an indication that the skip mode encoding is not good enough, and then terminates. Otherwise, when the current macroblock's coarse motion vector meets the criteria, then the process determines (at 230) whether the RD cost of the skip-mode encoding of the current macroblock is within a certain percentage of the RD cost of the skip-mode encoding of the set of adjacent neighboring macroblocks identified at 210. If not, the process returns (at 270) an indication that the skip mode encoding is not good enough, and then terminates.

Otherwise, the process determines (at 240) whether the "masking strength" of the current macroblock is within a certain percentage of the masking strengths of the set of adjacent neighboring macroblocks identified at 210. Masking strength provides an indication of how much coding artifacts can be hidden in a macroblock due to spatial attributes of the macroblock and/or motion attributes of the macroblock. One way of computing the masking strength is disclosed in U.S. patent application Ser. No. 11/118,604 entitled "Encoding with Visual Masking" filed concurrently with this application. This United States Patent Application, now issued as U.S. Pat. No. 8,005,139, is herein incorporated by reference.

If the process determines (at 240) that the "masking strength" criterion is not met, the process returns (at 270) an indication that the skip mode encoding is not good enough, and then terminates. Otherwise, the process returns (at 250) an indication that the skip mode encoding is good enough, and then terminates.

III. Interblock Encoding and Pruning

The encoding process 100 of FIG. 1 performs interblock encoding at 135. As mentioned above, the interblock encoding is a multi-stage encoding process in some embodiments. This multi-stage process includes a coarse stage motion estimation stage and a refined motion estimation stage. During the refined motion estimation stage, some embodiments use various pruning methods to narrow the decision space for items to encode. Pruning can also be used to reduce the number of calculations and amount of storage required during coding. Some of these pruning methods are discussed below.

Figure 4:
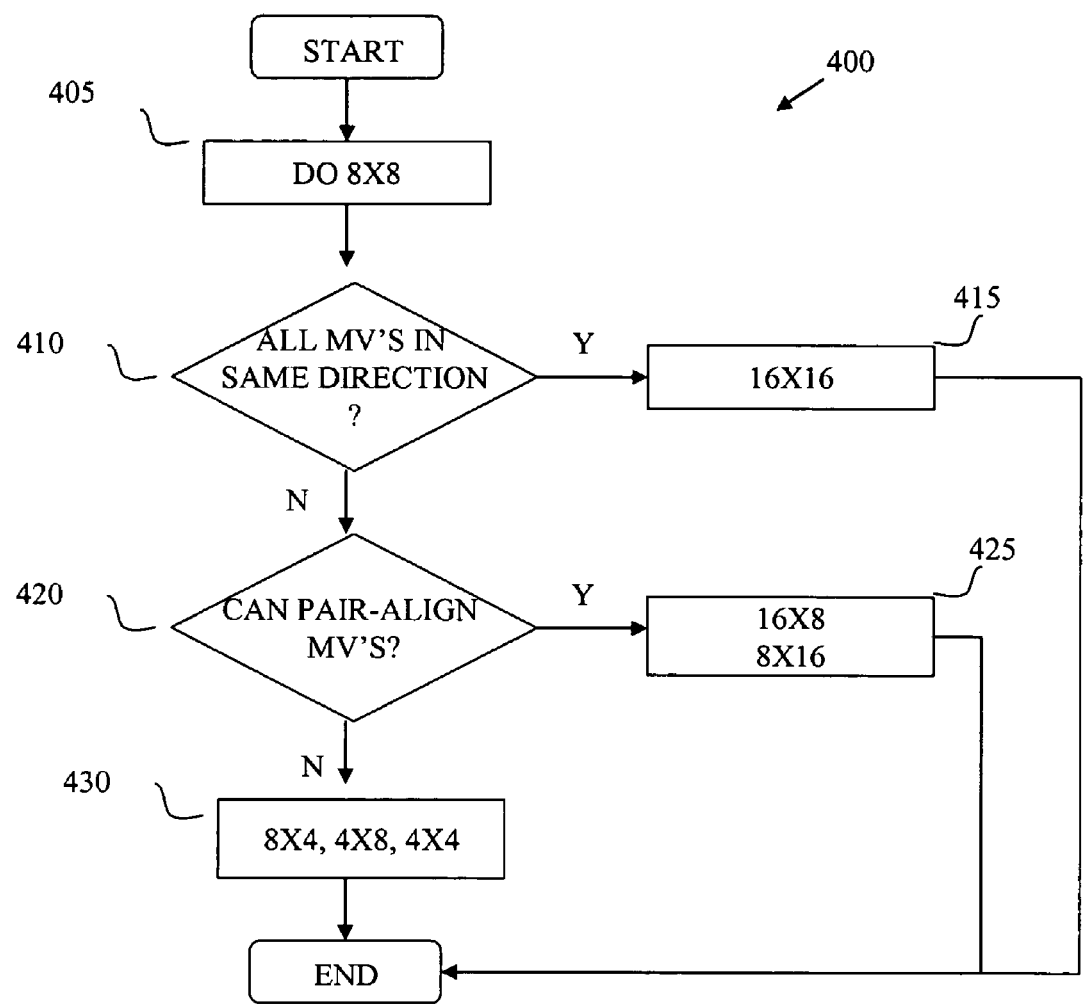
FIG. 4 presents a process that conceptually illustrates the flow of a macroblock-partition-pruning method of an encoder of some embodiments of the invention.

A. Three types of prunings that the interblock encoding process can use are described below. These three types are: (1) macroblock partition pruning, (2) sub-macroblock partition pruning, and (3) B-mode pruning. Macroblock Partition Pruning FIG. 4 presents a process 400 that conceptually illustrates the flow of a macroblock-partition-pruning method of an encoder of some embodiments of the invention. As shown in this figure, the process 400 initially performs (at 405) motion estimation searches for the 8×8 blocks within the macroblock. These searches produce four motion vectors for the four 8×8 blocks.

Figure 5:
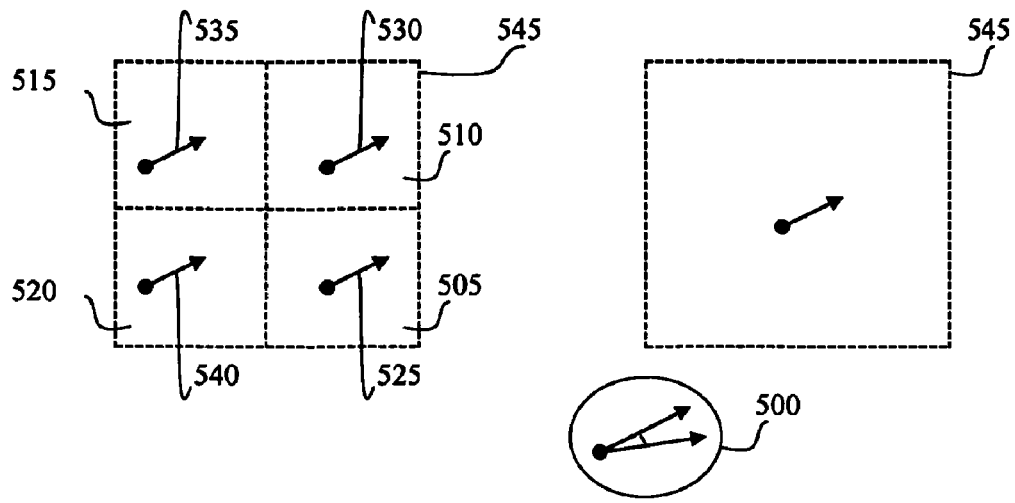
FIG. 5 illustrates an example where the encoder would perform a motion estimation on the macroblock, as all its 8×8 blocks point roughly in the same direction.

The process 400 uses the result of 8×8 searches as a hint as to how to encode the macroblock. For instance, at 410, the process determines whether the four motion vectors identified for the 8×8 blocks at 405 are approximately aligned in the same direction (e.g., their directions are within a certain threshold angle of each other) and have approximately the same magnitude. FIG. 5 illustrates an example of four motion vectors 505-520 for four 8×8 blocks 525-540. These four motion vectors have approximately the same magnitude and are pointing in the same direction.

If the four motion vectors have approximately the same length and are approximately aligned in the same direction, the process performs (at 415) a motion estimation search for the macroblock, i.e., for the 16×16 pixel array. For instance, in the example illustrated in FIG. 5, the encoder would (at 415) perform a motion estimation on the macroblock 545, as all its 8×8 blocks point roughly in the same direction. After 415, the encoder would then select between the encoding solution that results from the 8×8 searches and the encoding solution that results from the 16×16 search.

When the process determines (at 410) that not all the motion vectors point approximately in the same direction or have approximately the same length, then the process checks (at 420) the resulting motion vectors of the 8×8 searches to determine whether the motion vectors of two horizontally aligned or vertically aligned 8×8 blocks can be pair aligned (i.e., to determine whether two 8×8 blocks of the macroblock can be pair-aligned). Two motion vectors can be pair-aligned when they approximately point in the same direction (e.g., their directions are within a certain threshold angle of each other) and have approximately the same length (e.g., their lengths are within a certain percentage of each other).

Figure 6:
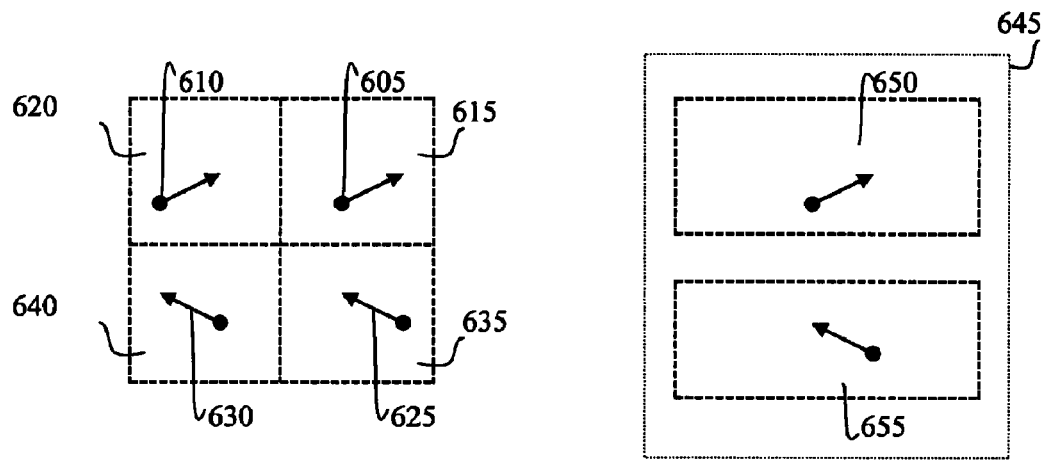
FIG. 6 illustrates an example of four 8×8 blocks.

FIG. 6 illustrates an example of four such 8×8 blocks. Specifically, it illustrates a macroblock 645 that contains four 8×8 blocks 615, 620, 625, and 630. It also illustrates two approximately equal motion vectors 605 and 610 for two horizontally aligned 8×8 blocks 615 and 620 that are pointing in roughly the same direction, and two approximately equal motion vectors 625 and 630 for two horizontally-aligned 8×8 blocks 635 and 640 that are pointing in roughly the same direction.

Figure 7:
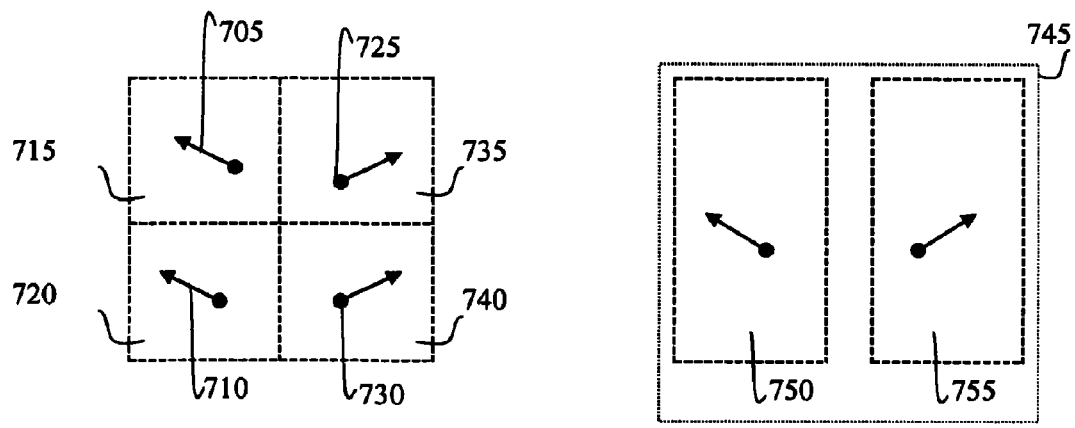
FIG. 7 illustrates another example of four 8×8 blocks.

FIG. 7 illustrates another example of four such 8×8 blocks. Specifically, it illustrates a macroblock 745 that contains four 8×8 blocks 715, 720, 730, and 740. It also illustrates two approximately equal motion vectors 705 and 710 for two vertically aligned 8×8 blocks 715 and 720 that are pointing in roughly the same direction, and two approximately equal motion vectors 725 and 730 for two vertically-aligned 8×8 blocks 735 and 740 that are pointing in roughly the same direction.

When the four 8×8 motion vectors can be grouped (at 420) into two pairs of horizontally or vertically aligned motion vectors, the process then performs (at 425) motion estimation searches for the 16×8 and 8×16 partitions within the macroblock. For instance, in the example illustrated in FIG. 6, the encoder would (at 415) perform a motion estimation on two 16×8 partitioned blocks 650 and 655 of the macroblock 645, while, in the example illustrated in FIG. 7, the encoder would (at 415) perform a motion estimation on two 8×16 partitioned blocks 750 and 755 of the macroblock 745. After 425, the encoder would then select between the encoding solutions that resulted from the 8×8, 16×8, and 8×16 searches.

When the process determines (at 420) that the four 8×8 motion vectors cannot be grouped into two pairs of horizontally or vertically aligned motion vectors, the process then performs (at 435) motion estimation searches for the 4×8, 8×4, and 4×4 sub-macroblock partitions within the macroblock. The encoder would then select between the encoding solutions that resulted from the 8×8, 4×8, 8×4, and 4×4 searches.

B. Sub-Macroblock Partition Pruning

Figure 8:
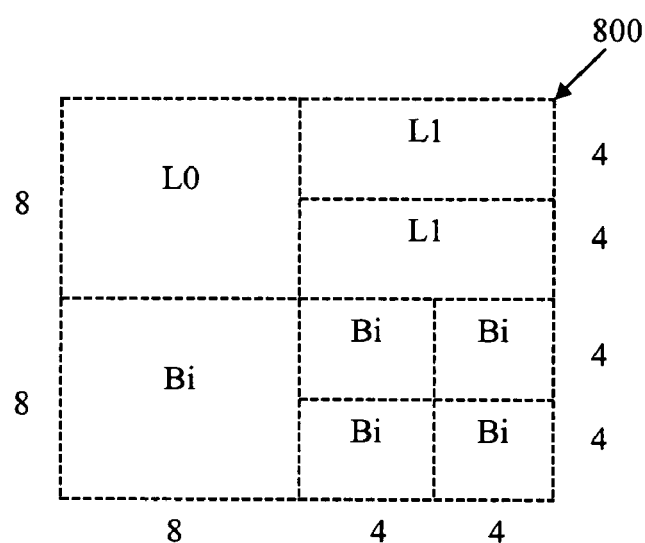
FIG. 8 illustrates an example of sub-macroblocks within a 16×16 macroblock.

In some embodiments, the encoder prunes certain sub-macroblock modes that are not useful for encoding. FIG. 8 illustrates one example of sub-macroblock encoding a macroblock. As shown in this figure, sub-macroblock encoding can result in a partition encoding of the macroblock that refers in part to reference frame L0, in part to reference frame L1, and in part to both reference frames L0 and L1. Such encoding is often quite time consuming as there are several variations for encoding the sub-macroblocks and combining these encoding variations.

Hence, some embodiments prune (forego) certain sub-macroblock modes when these modes are deemed not to be useful. For instance, some embodiments prune bi-directional mode (B-mode) encoding at the sub-macroblock level of 8×8, 8×4, 4×8, and 4×4. Also, in some embodiments, the encoder determines whether the search window is smaller than a particular threshold. If the search window is smaller than the threshold size, the encoder then does not examine the B-mode sub-macroblock encoding possibilities. In some embodiments, however, the encoder will still perform the P-mode sub-macroblock encodings when the window is smaller than the threshold. Alternatively, in other embodiments, the encoder foregoes the P-mode sub-macroblock encodings when the search window is smaller than its threshold size.

The encoder of some embodiments examines the texture of the current frame to direct some of its pruning operations. For instance, when the current macroblock has a flat texture, the encoder in some embodiments will not examine the B- and P-mode encoding solutions at the sub-macroblock level.

Figure 9:
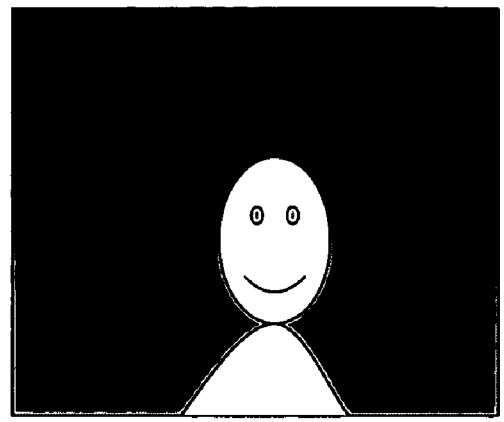
FIG. 9 illustrates a reference frame with blocks that have a flat texture.

FIG. 9 illustrates a frame with blocks that have a flat texture. As shown in FIG. 9, a flat texture is a pattern of contiguous pixels that does not change significantly from one pixel to the next, within a frame. Thus, a flat texture appears to be a smooth surface. This feature of a frame is a form of spatial redundancy. Therefore, some embodiments exploit spatial redundancy in a frame by using the existence of redundant spatial information to prune some of the more time-consuming motion estimation operations. Some embodiments detect a flat texture in the current macroblock by using the variance of the average pixel value of each 4×4 partition in the current macroblock. If the variance is greater than a threshold, the texture is not flat.

Also, the encoder of some embodiments checks the current frame for a static background. When the current frame has a static background in the region that neighbors the current macroblock, the encoder in some embodiments will not examine the P- and B-mode sub-macroblock encodings.

Figure 10:
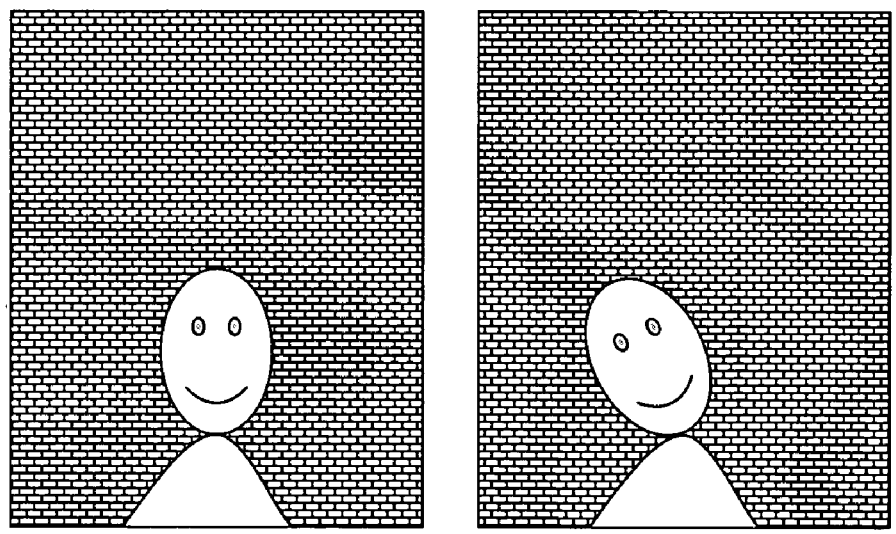
FIG. 10 illustrates two frames in a sequence with a static background.

FIG. 10 illustrates two frames in a sequence with a static background. A static background is a pattern of pixels that does not change significantly from one frame to the next. A static background differs from a flat texture in that a static background can have a highly complex pixel pattern, such as the brick-pattern shown in FIG. 10, but these pixels change little between the frames. This feature between frames is a form of temporal redundancy. Therefore, the encoder of some embodiments exploits the temporal redundancy between frames by pruning the redundant temporal data prior to processing time-consuming decisions and calculations. Some embodiments detect a static background in a region of the current frame that contains the current macroblock. If all the neighbor macroblocks of the current macroblock have motion vectors that are within a tight threshold of each other (e.g., the motion vectors are approximately pointing the same direction and approximately have the same magnitude) and these neighbors have big block sizes, then the region has a static background. Big blocks are more representative of the local background region.

C. B-Mode Pruning at the Macroblock Level

In some embodiments, the encoder prunes in many instances B-mode macroblock encoding possibilities. Before describing these pruning operations, a brief overview of B-mode macroblock encodings is provided by reference to FIG. 11. This figure illustrates that the encoder can construct a current frame by using a first reference frame (L0), a second reference frame (L1), or a combination of the first and second reference frames (Bi). Likewise, the encoder can construct a macroblock in the current frame by using any of these three references (L0, L1, B1). For a 16×16 macroblock, the encoder can use twenty-one possible combinations (modes) to construct the current macroblock.

Figure 11:
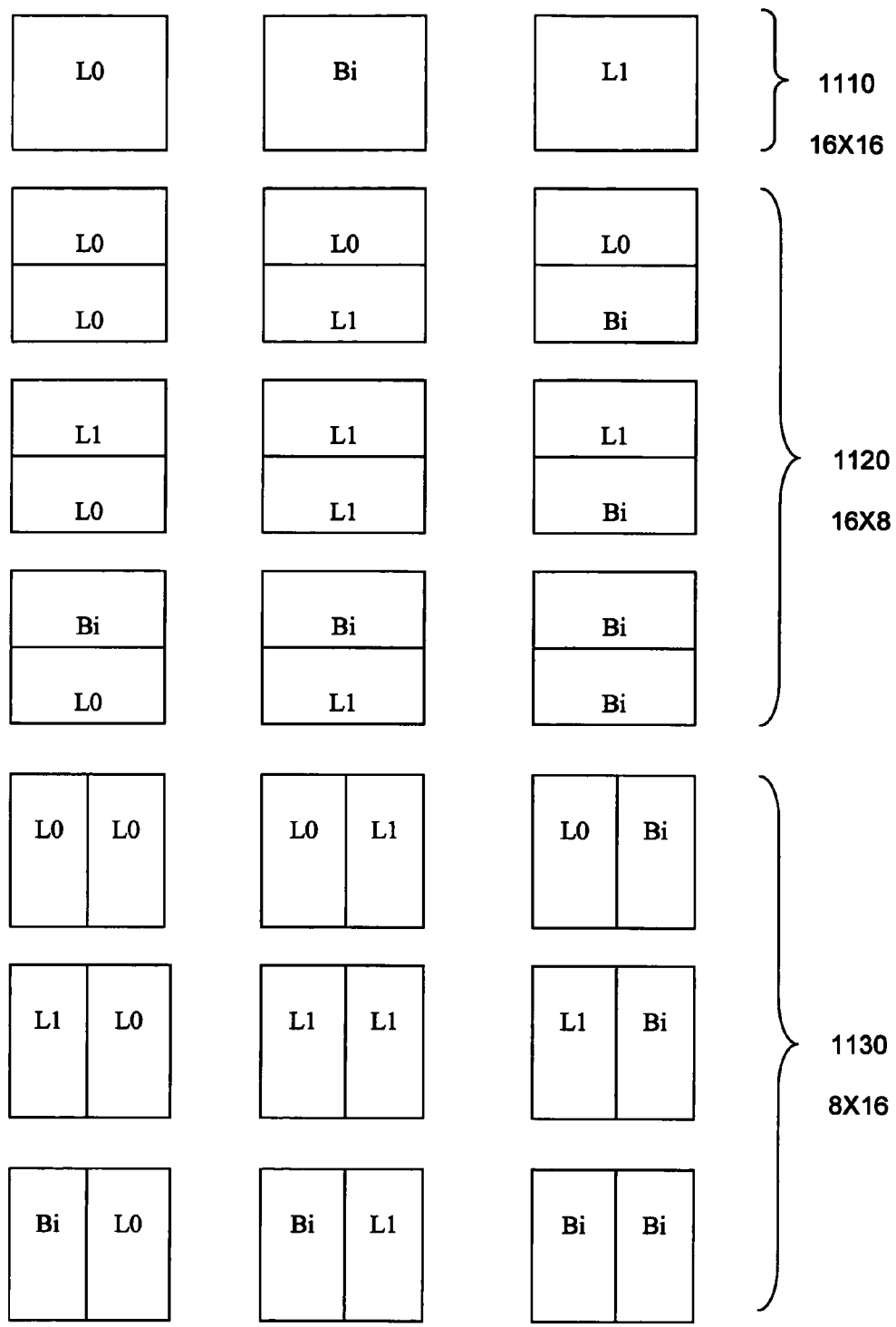
FIG. 11 illustrates the twenty-one modes for encoding a 16×16 macroblock grouped into three groups.

As shown in FIG. 11, these modes can be grouped into three groups. Group 1110 comprises three modes L0, L1, and B1. These modes represent 16×16 macroblocks that were respectively constructed using the L0 reference, the L1 reference, and the Bi reference (a combination of the L0 and L1 references). Historically in the art, L0 referred to a preceding frame and L1 referred to a succeeding frame. However, today, either or both L0 and L1 can be preceding or succeeding reference frames. Group 1120 comprises nine modes. These nine modes represent nine combinations of 16×8 reference pairs. Group 1130 comprises another nine modes, which represent nine combinations of 8×16 reference pairs.

1. Unlikely Modes can be Pruned.

Figure 12:
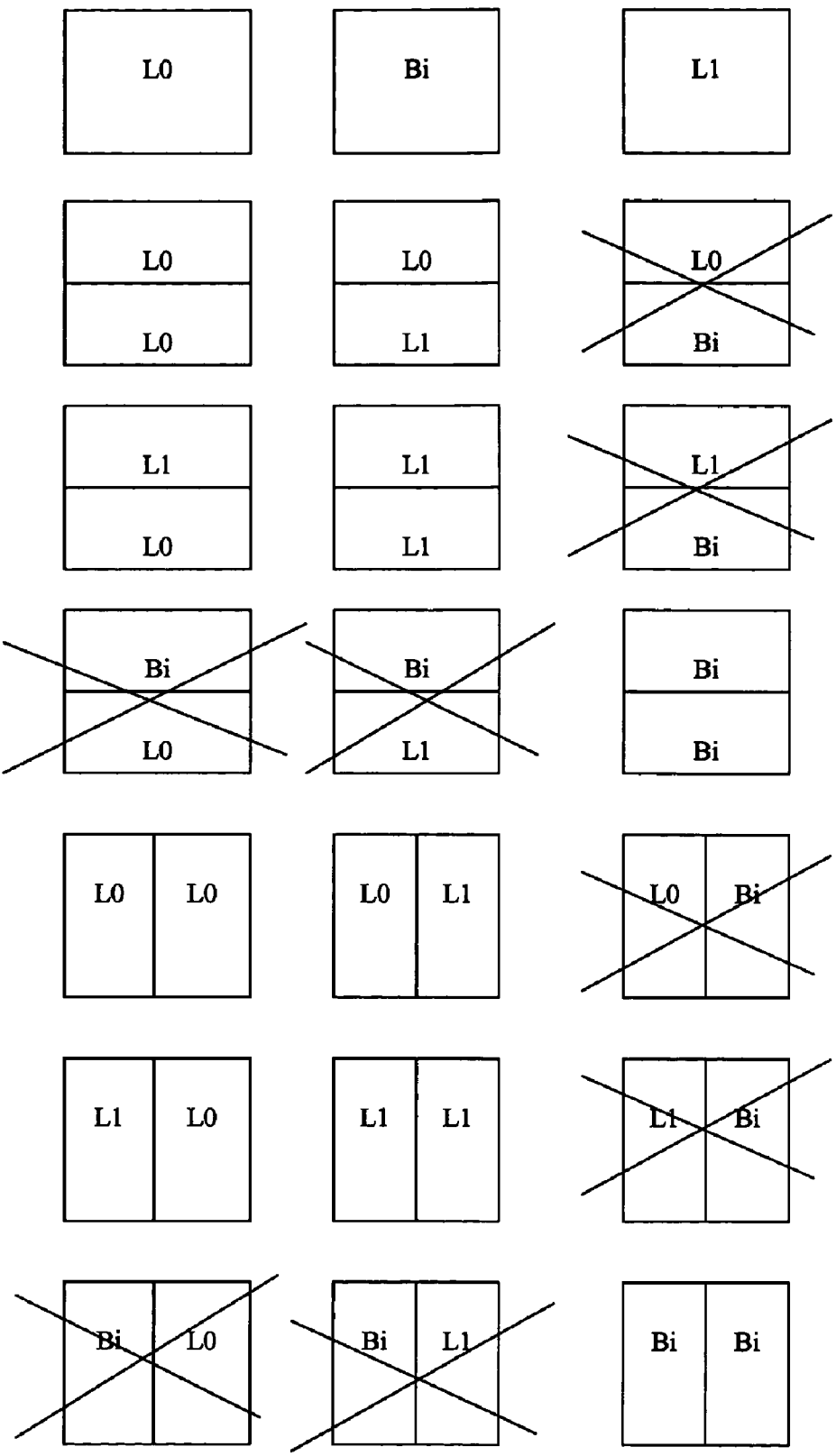
FIG. 12 illustrates unlikely modes crossed-out to represent their removal by the encoder, in accordance with some embodiments of the invention.

In some embodiments, the encoder discards (prunes) unlikely modes to reduce processing of unnecessary data during encoding. For instance, modes containing L and Bi combinations have low probability of occurring in a frame. FIG. 12 shows these unlikely modes crossed-out to represent their removal by the encoder, in accordance with some embodiments of the invention. Thus, in some embodiments, the encoder excludes these unlikely modes from the decision space of encoding solutions to explore.

2. One Reference Frame not Useful

Figure 13:
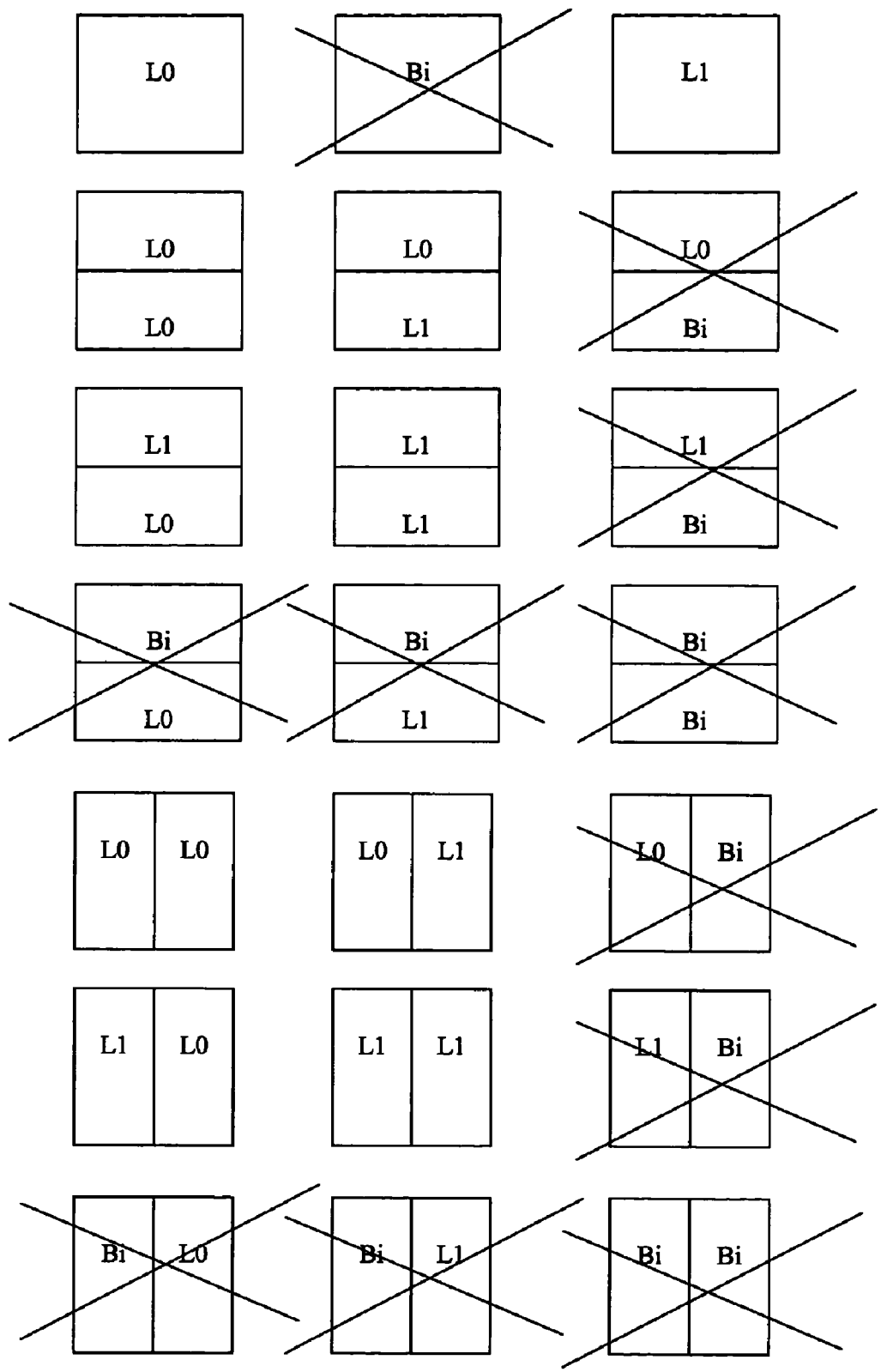
FIG. 13 illustrates an example of pruning of most macroblock encoding solutions in some embodiments, when the L1 reference frame is determined not to be useful.
Figure 14:
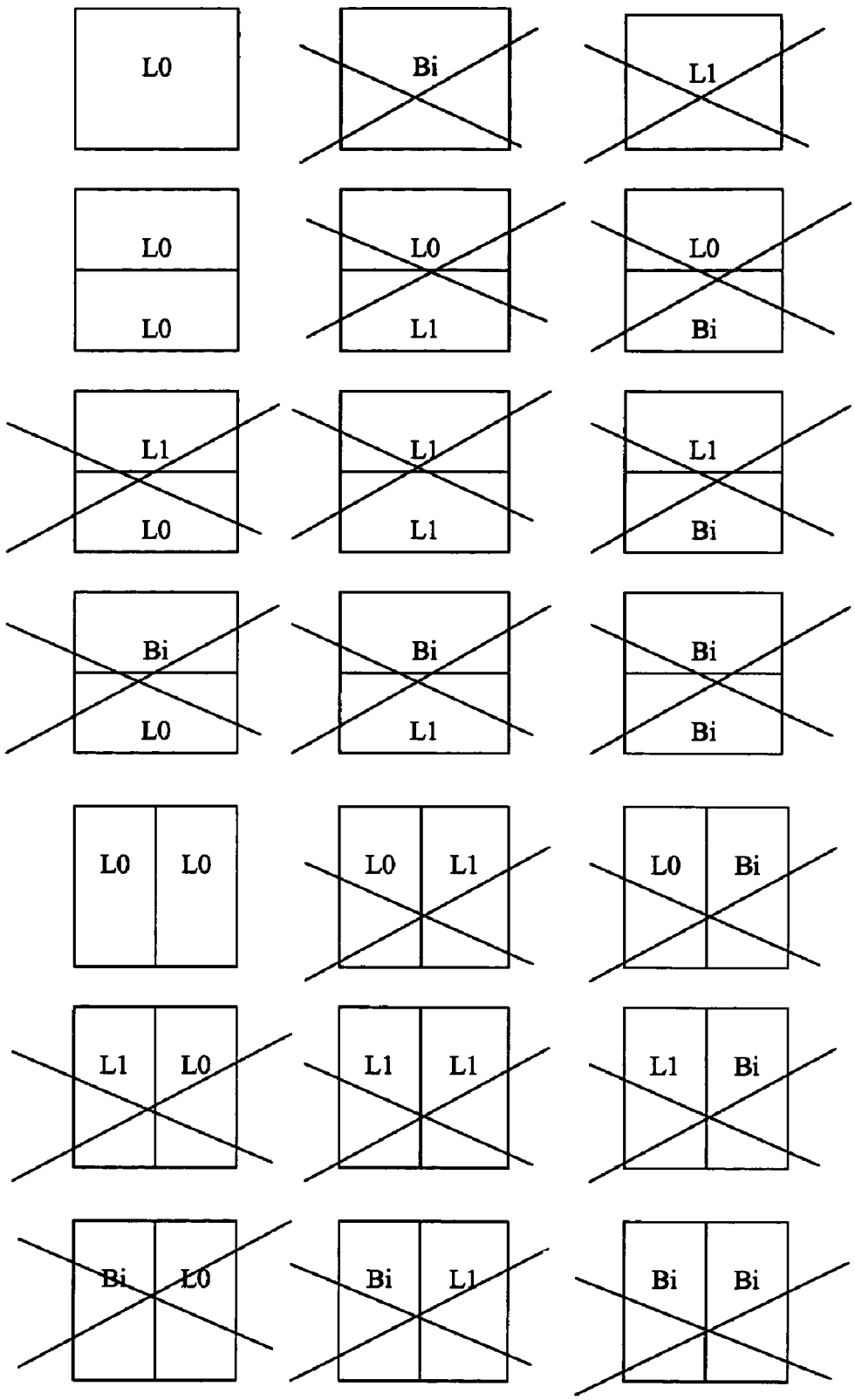
FIG. 14 illustrates another example of pruning for the case when the L1 reference frame is determined not to be useful.

In some embodiments, the encoder does not fully explore using B-mode encoding when one reference frame is not useful. For instance, FIG. 13 illustrates an example of pruning of most macroblock encoding solutions in some embodiments, when the L1 reference frame is determined not to be useful. This pruning has removed all encoding solutions that search for Bi-directional motion vectors for a macroblock or a partition of the macroblock. For the case when the L1 reference frame is determined not to be useful, FIG. 14 illustrates another example of pruning. In this example, the encoder has pruned not only the search for Bi-directional motion vectors but also has pruned the search for motion vectors in the L1 reference frame.

In some embodiments, the encoder determines whether a reference frame would be useful during a coarse, first-stage search, like the one described by reference to U.S. patent application Ser. No. 11/119,414, entitled "Encoding and Decoding Images", now published as U.S. Patent Publication 2005/0286777. Based on this determination, the encoder in these embodiments then prunes the encoding solutions that it explores during a refined, second-stage search, like the one described by reference to the above-mentioned United States Patent Application. This pruning typically allows the encoder to forego even performing the motion estimation searches for the pruned encoding modes.

Figure 15:
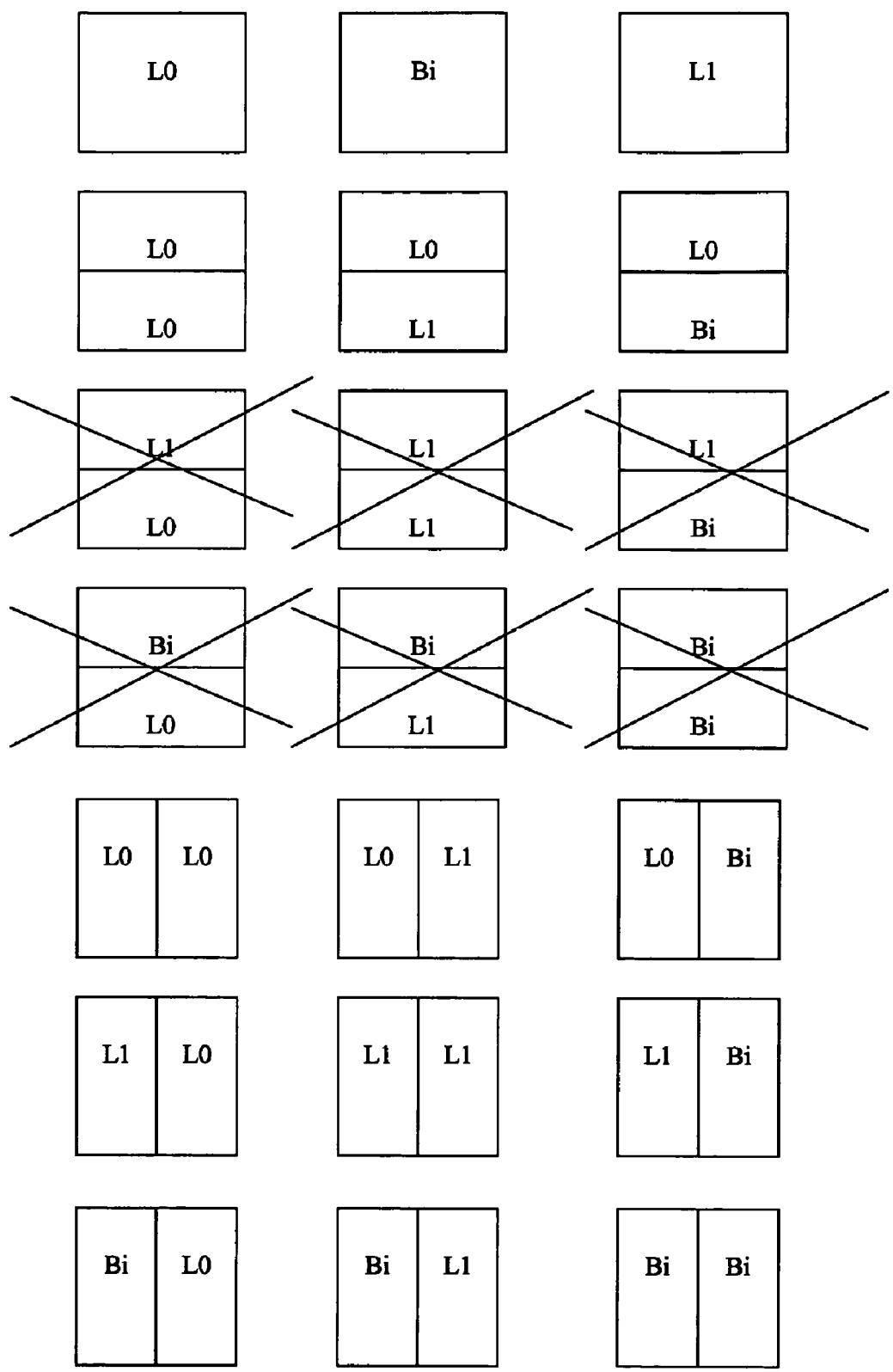
FIG. 15 illustrates a determination to prune the analysis of six of the nine possible 16×8 modes, in accordance with some embodiments of the present invention.

However, in certain instances, the pruning is performed after the motion estimation searches are performed. This pruning is done to save time in analyzing the results of the motion estimation search. For instance, during or after the motion estimation searches, the encoder might determine that the L1 reference frame was not useful for the top 16×8 partition of the macroblock. The encoder in some embodiments then uses this determination to prune the analysis of six of the nine possible 16×8 modes, as illustrated in FIG. 15. This pruning saves time and saves the computational resources needed for computing and comparing costs for the pruned solutions.

3. One Reference Frame Sufficient.

In some embodiments, the encoder does not encode using B-mode encoding when one reference frame produced sufficiently good results. In some embodiments, the encoder determines whether a reference frame provides a sufficiently good result during a coarse, first-stage search, like the one described in the above-incorporated U.S. patent application Ser. No. 11/119,414, entitled "Encoding and Decoding Images", now published as U.S. Patent Publication 2005/0286777. Based on this determination, the encoder in these embodiments then prunes the encoding solutions that it explores during a refined, second-stage search (like the one described by reference to U.S. patent application Ser. No. 11/119,414, entitled "Encoding and Decoding Images", now published as U.S. Patent Publication 2005/0286777). For instance, when the L0 reference frame is determined to be sufficiently useful, some embodiments prune the encoding solutions in the manner illustrated in FIG. 13 or FIG. 14, which were described above.

Many of the macroblock pruning techniques that were described above are equally applicable to the sub-macroblock level.

IV. Intrablock Pruning

Figure 16:
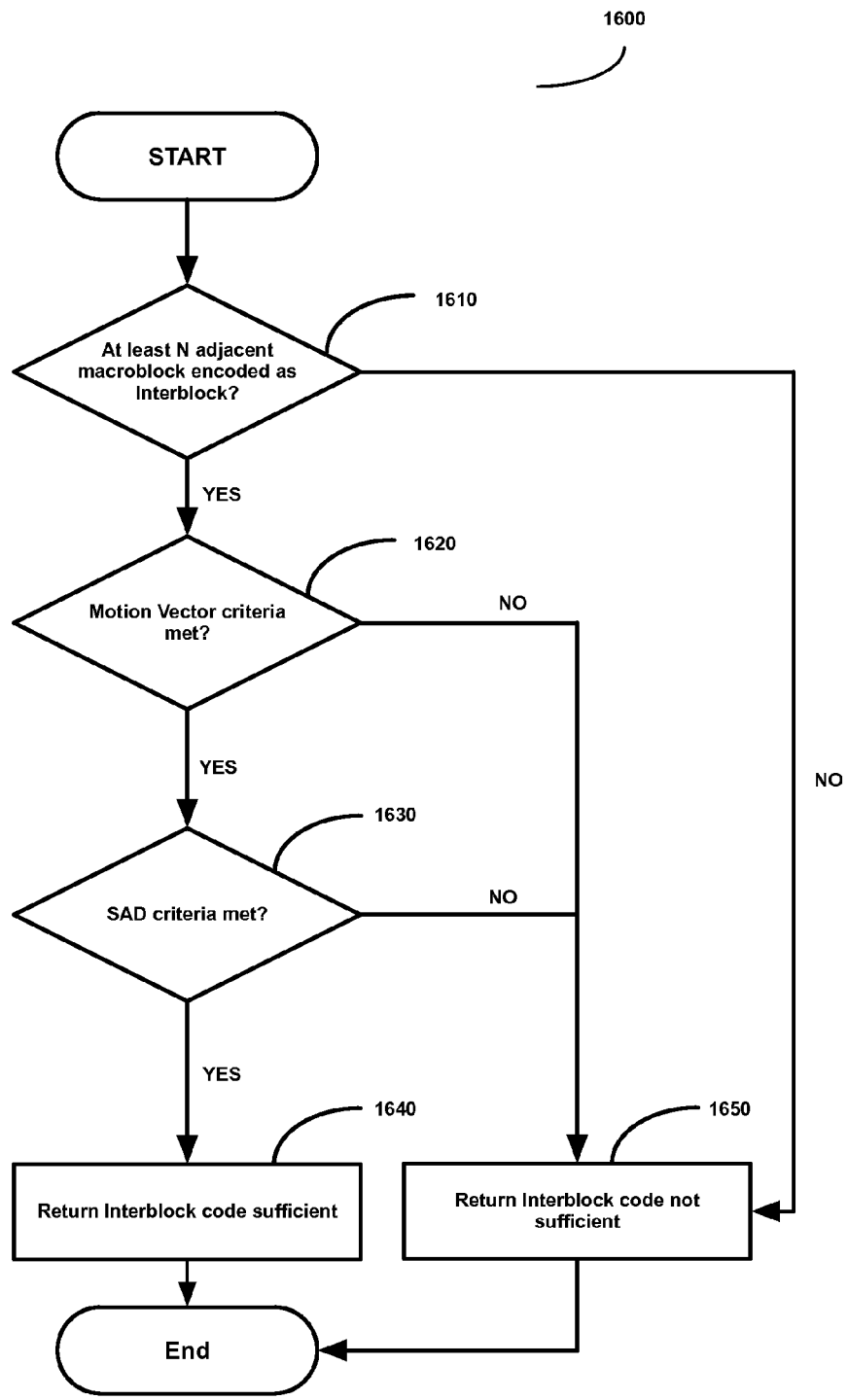
FIG. 16 illustrates a process that determines whether the interblock encoding solutions identified were sufficiently good so that the encoding process could forego considering the intrablock encoding.

At 140, the process 100 determines whether the interblock encoding solutions identified at 135 were sufficiently good so that the encoding process could forego considering the intrablock encoding. FIG. 16 illustrates a process 1600 that makes this determination at 140.

As mentioned above, before this process starts, some embodiments have already performed the coarse, first-stage motion estimation and have identified motion vectors for the current macroblock and its adjacent neighbors in the current frame. Also, by the time the encoder is encoding the current macroblock, it has already performed the more refined, second stage encoding of the adjacent neighboring macroblocks of the current macroblock. As mentioned above, FIG. 3 illustrates an example of a current macroblock 300 and several of this macroblock's adjacent neighbors 305-320.

As shown in FIG. 16, the process 1600 initially determines (at 1610) whether at least n macroblocks that are adjacent neighbors of the current macroblock in the current frame are interblock encoded. In some embodiments, n is one, while it is a number greater than one in other embodiments. When n is smaller than the number of adjacent neighboring macroblocks that are interblock encoded, the process 1600 might be performed several times. In each iteration of the process, a different subset of the neighboring macroblocks might be examined, where each subset has n interblock-encoded, adjacent neighboring macroblocks. Hence, all these iterations are performed to determine whether any of the subsets has a set of statistics that matches the current macroblock.

When n adjacent neighboring macroblocks are not interblock-mode encoded, the process returns (at 1650) an indication that the interblock mode encoding is not good enough, and then terminates. However, when n adjacent neighboring macroblocks are interblock-mode encoded, the process determines (at 1620) whether the current macroblock's motion vector satisfies two criteria. The first criterion is that the current macroblock's motion vector has to point to the same reference frame as the set of adjacent neighboring macroblocks identified at 1610.

The second criterion requires that the current macroblock's coarse motion vector to be within a certain threshold of the coarse motion vectors of the set of the adjacent, neighboring macroblocks that were identified at 1610. Specifically, the direction of the current macroblock's coarse motion vector has to be within a certain angular threshold of the directions of the identified neighboring macroblock's coarse motion vectors. Also, the length of the current macroblock's coarse motion vector has to be within a certain size threshold/percentage of the lengths of the identified neighboring macroblock's coarse motion vectors. The coarse motion vectors were identified for the macroblock of the current frame during a coarse, first stage search for each of these macroblocks.

If the process determines (at 1620) that the current macroblock's coarse motion vector does not satisfy the criteria, the process returns (at 1650) an indication that the interblock mode encoding is not good enough, and then terminates. Otherwise, when the current macroblock's coarse motion vector meets the criteria, then the process determines (at 1630) whether the SAD (sum of absolute differences) metric score of the interblock-mode encoding of the current macroblock is within a certain percentage of the SAD metric score of the interblock-mode encoding of the set of adjacent neighboring macroblocks identified at 1610. Some embodiments compute an SAD metric score for a macroblock as follows:

$$SAD = \sum_i |x_i - y_i|,$$

where $x_i$ is a luminance value in the current frame, $y_i$ is the ith luminance value in the reference frame, and i is a variable from 1 to the number of pixels in the macroblocks. However, in some embodiments, the SAD metric score for a macroblock may include one or more chrominance values in the reference frame. In some embodiments, the SAD metric score for a macroblock is computed by performing the above described operation for each of the color channels and aggregating the results.

If the current macroblock's SAD score does not satisfy its percentage criteria at 1630, the process returns (at 1650) an indication that the interblock mode encoding is not good enough, and then terminates. Otherwise, the process returns (at 1640) an indication that the interblock mode encoding is good enough, and then terminates.

V. Bit Driven Mode Decision

Once the encoder reduces the field of possible modes by pruning, in some embodiments, the encoder can apply additional methods to the decision space to determine the best mode to encode (e.g., interblock, intrablock). In some embodiments, a mode can be chosen even more quickly, with or without pruning. Pruning and mode decision can be critical factors in time-constrained applications such as real-time video encoding.

Given a limited time, and given many possible modes for encoding, even pruning may not be fast enough. An encoder can select a mode more quickly if the encoder makes certain tradeoffs. For example, the encoder can forego finding the best mode for encoding to accelerate the mode decision process. Some alternate criteria for selecting an encoding mode can be based on the number of bits required to encode each mode. Given a macroblock, the encoder is aware of how many bits are allocated to encode the macroblock based on the rate controller. In some embodiments, the encoder finds a mode that fits the bit allocation for encoding the macroblock and simply stops searching and encodes that mode. This is a valuable heuristic for intra-blocks because intra-blocks are typically larger than inter-blocks. For example, a macroblock's bit allocation can be 100-bits. An intra-block to be encoded requires 50-bits and an inter-block requires 10-bits. The intra-block can simply be encoded since it meets the bit allocation for the macroblock VI. Computer System FIG. 17 conceptually illustrates a computer system with which some embodiments of the invention is implemented. Computer system 1700 includes a bus 1705, a processor 1710, a system memory 1715, a read-only memory 1720, a permanent storage device 1725, input devices 1730, and output devices 1735.

The bus 1705 collectively represents all system, peripheral, and chipset buses that support communication among internal devices of the computer system 1700. For instance, the bus 1705 communicatively connects the processor 1710 with the read-only memory 1720, the system memory 1715, and the permanent storage device 1725.

From these various memory units, the processor 1710 retrieves instructions to execute and data to process in order to execute the processes of the invention. The read-only-memory (ROM) 1720 stores static data and instructions that are needed by the processor 1710 and other modules of the computer system. The permanent storage device 1725, on the other hand, is a read-and-write memory device. This device is a non-volatile memory unit that stores instruction and data even when the computer system 1700 is off. Some embodiments of the invention use a mass-storage device (such as a magnetic or optical disk and its corresponding disk drive) as the permanent storage device 1725. Other embodiments use a removable storage device (such as a floppy disk or Zip® disk, and its corresponding disk drive) as the permanent storage device.

Like the permanent storage device 1725, the system memory 1715 is a read-and-write memory device. However, unlike storage device 1725, the system memory is a volatile read-and-write memory, such as a random access memory. The system memory stores some of the instructions and data that the processor needs at runtime. In some embodiments, the invention's processes are stored in the system memory 1715, the permanent storage device 1725, and/or the read-only memory 1720.

The bus 1705 also connects to the input and output devices 1730 and 1735. The input devices enable the user to communicate information and select commands to the computer system. The input devices 1730 include alphanumeric keyboards and cursor-controllers. The output devices 1735 display images generated by the computer system. The output devices include printers and display devices, such as cathode ray tubes (CRT) or liquid crystal displays (LCD).

Figure 17:
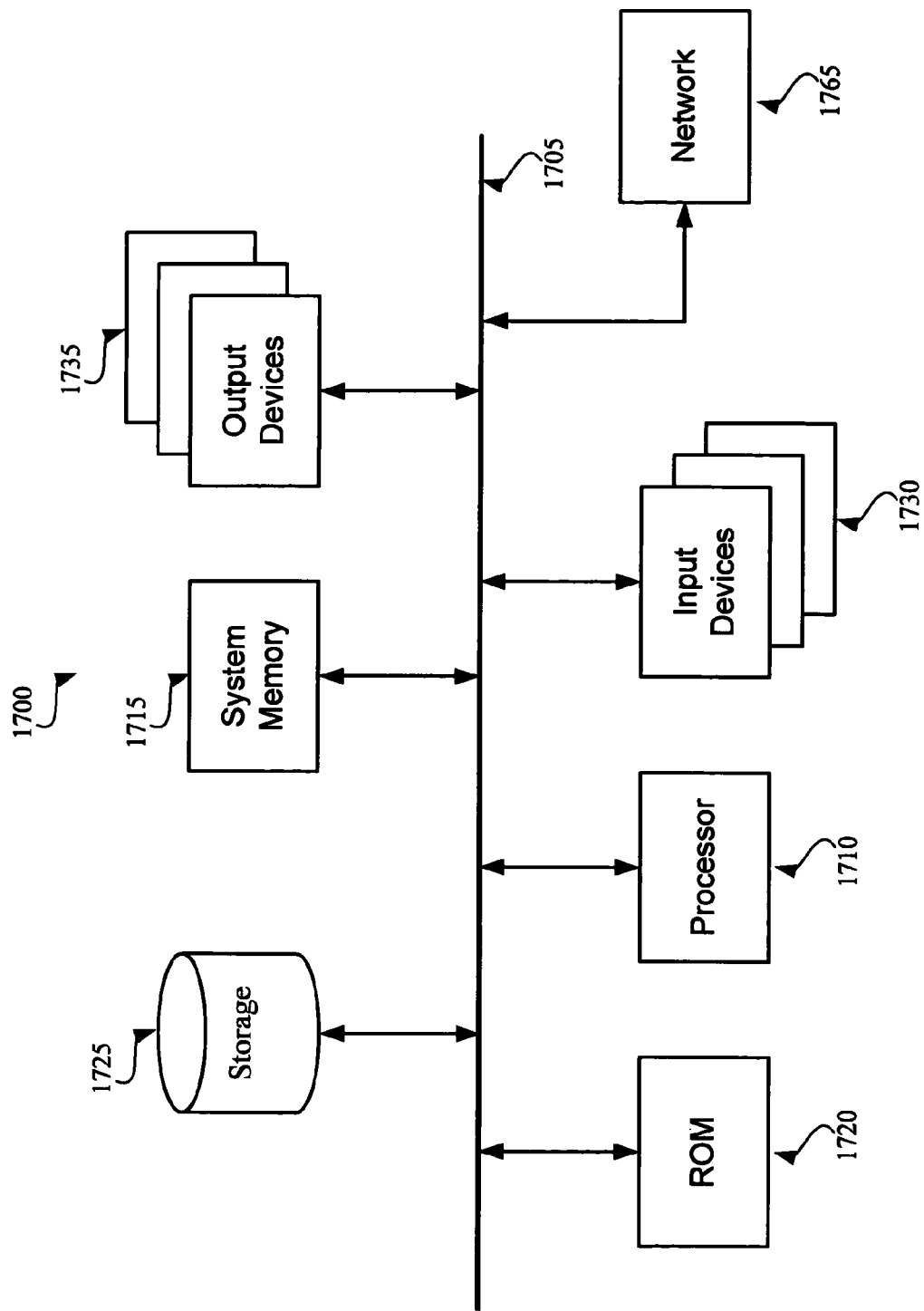
FIG. 17 illustrates a computer system with which some embodiments of the invention are implemented.

Finally, as shown in FIG. 17, bus 1705 also couples computer 1700 to a network 1765 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1700 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. For instance, many embodiments of the invention were described above by reference to macroblocks. One of ordinary skill will realize that these embodiments can be used in conjunction with any other array of pixel values.

What is claimed is:

1. A method for encoding a first set of pixels in a first image in a sequence of images, the method comprising:
   identifying a first motion vector for the first set of pixels and a second motion vector for a non-overlapping second set of pixels that is adjacent to the first set of pixels in the first image, wherein the first and second motion vectors are defined by reference to a second image in the sequence of images;
   by a computing device, determining whether an angular difference between the first motion vector and the second motion vector is within a first threshold;
   determining whether a length difference between the first motion vector and the second motion vector is within a second threshold; and
   when the angular difference is within the first threshold and the length difference is within the second threshold, selecting skip mode encoding as an encoding mode for the first set of pixels, wherein the skip mode encoding for the first set of pixels indicates that the first set of pixels is decoded by referencing the motion vector of the second set of pixels.

2. The method of claim 1, wherein selecting the skip mode encoding as the encoding mode for the first set of pixels is based on a determination of whether skip mode encoding is selected for encoding the second set of pixels.

3. The method of claim 1, wherein the identifying comprises identifying a plurality of motion vectors, wherein each motion vector in said plurality of motion vectors is for a set of pixels in a plurality of sets of pixels in the first image, wherein each set of pixels in said plurality of sets of pixels is adjacent to the first set of pixels in the first image.

4. The method of claim 3, wherein determining whether the angular difference between the first motion vector and the second motion vector is within the first threshold comprises determining whether an angular difference between the first motion vector and each motion vector in the plurality of motion vectors is within the first threshold.

5. The method of claim 1, wherein the first and second motion vectors are computed during a motion estimation operation that is performed prior to encoding the first set of pixels.

6. The method of claim 1, further comprising determining whether a particular difference between a rate-distortion (RD) cost of the first set of pixels and an RD cost of the second set of pixels is within a third threshold, wherein selecting skip mode encoding as the encoding mode for the first set of pixels further comprises selecting skip mode encoding as the encoding mode for the first set of pixels when the particular difference is within the third threshold.

7. The method of claim 1 further comprising determining whether a particular difference between a masking strength of the first set of pixels and a masking strength of the second set of pixels is within a third threshold, wherein selecting skip mode encoding as the encoding mode for the first set of pixels further comprises selecting skip mode encoding as the encoding mode for the first set of pixels when the particular difference is within the third threshold.

8. The method of claim 1 further comprising, when the angular difference is within the first threshold, selecting direct mode encoding as another encoding mode for the first set of pixels.

9. The method of claim 1 further comprising, when the angular difference is not within the first threshold, selecting interblock mode encoding as the encoding mode for the first set of pixels.

10. The method of claim 1 further comprising, when the angular difference is not within the first threshold, selecting intrablock mode encoding as the encoding mode for the first set of pixels.

11. A non-transitory computer readable medium storing a computer program which when executed by at least one processor encodes a first set of pixels in a first image in a sequence of images, the computer program comprising sets of instructions for:
   identifying a first motion vector for the first set of pixels and a second motion vector for a second set of pixels that is adjacent to the first set of pixels in the first image, wherein a number of pixels in the first set of pixels and a number of pixels in the second set of pixels are the same, wherein the first and second motion vectors are defined by reference to a second image in the sequence of images;
   determining whether an angular difference between the first motion vector and the second motion vector is within a first threshold;
   determining whether a length difference between the first motion vector and the second motion vector is within a second threshold; and
   selecting skip mode encoding as an encoding mode for the first set of pixels when the angular difference is within the first threshold and the length difference is within the second threshold, wherein the skip mode encoding for the first set of pixels indicates that the first set of pixels is decoded by referencing the motion vector of the second set of pixels.

12. The non-transitory computer readable medium of claim 11, wherein selecting the skip mode encoding as the encoding mode for the first set of pixels is based on a determination of whether skip mode encoding is selected for encoding the second set of pixels.

13. The non-transitory computer readable medium of claim 11, wherein the set of instructions for identifying comprises a set of instructions for identifying a plurality of motion vectors, wherein each motion vector in said plurality of motion vectors is for a set of pixels in a plurality of sets of pixels in the first image, wherein each set of pixels in said plurality of sets of pixels is adjacent to the first set of pixels in the first image.

14. The non-transitory computer readable medium of claim 13, wherein selecting the skip mode encoding as the encoding mode for the first set of pixels is based on a determination of whether an angular difference between the first motion vector and each motion vector in the plurality of motion vectors is within the first threshold.

15. The non-transitory computer readable medium of claim 11, wherein the first and second motion vectors are computed during a motion estimation operation that is performed prior to encoding the first set of pixels.

16. The non-transitory computer readable medium of claim 11, wherein the computer program further comprises a set of instructions for determining whether a particular difference between a rate-distortion (RD) cost of the first set of pixels and an RD cost of the second set of pixels is within a third threshold, wherein the set of instructions for selecting skip mode encoding as the encoding mode for the first set of pixels further comprises a set of instructions for selecting skip mode encoding as the encoding mode for the first set of pixels when the particular difference is within the third threshold.

17. The non-transitory computer readable medium of claim 11, wherein the computer program further comprises a set of instructions for determining whether a particular difference between a masking strength of the first set of pixels and a masking strength of the second set of pixels is within a third threshold, wherein the set of instructions for selecting skip mode encoding as the encoding mode for the first set of pixels comprises a set of instructions for selecting skip mode encoding as the encoding mode for the first set of pixels when the particular difference is within the third threshold.

18. The non-transitory computer readable medium of claim 11, wherein the computer program further comprises a set of instructions for selecting direct mode encoding as another encoding mode for the first set of pixels when the angular difference is within the first threshold.

19. The non-transitory computer readable medium of claim 11, wherein the computer program further comprises a set of instructions for selecting interblock mode encoding as the encoding mode for the first set of pixels when the angular difference is not within the first threshold.

20. The non-transitory computer readable medium of claim 11, wherein the computer program further comprises a set of instructions for selecting intrablock mode encoding as the encoding mode for the first set of pixels when the angular difference is not within the first threshold.

21. A non-transitory computer readable medium storing a computer program which when executed by at least one processor encodes a first macroblock in a first image in a sequence of images, the computer program comprising sets of instructions for:
   identifying a first motion vector for the first macroblock and a second motion vector for a second macroblock that (i) is adjacent to the first macroblock in the first image and (ii) does not overlap with the first macroblock in the first image, wherein the first and second motion vectors are defined by reference to a second image in the sequence of images;
   determining whether an angular difference between the first motion vector and the second motion vector is within a first threshold;
   determining whether a length difference between the first motion vector and the second motion vector is within a second threshold; and
   selecting skip mode encoding as an encoding mode for the first macroblock when the angular difference is within the first threshold and the length difference is within the second threshold, wherein the skip mode encoding for the first macroblock indicates that the first macroblock is decoded by referencing the motion vector of the second macroblock.

22. The non-transitory computer readable medium of claim 21, wherein selecting the skip mode encoding as the encoding mode for the first macroblock is based on a determination of whether skip mode encoding is selected for encoding the second macroblock.

23. The non-transitory computer readable medium of claim 21, wherein the computer program further comprises a set of instructions for determining whether a particular difference between a rate-distortion (RD) cost of the first macroblock and an RD cost of the second macroblock is within a third threshold, wherein the set of instructions for selecting skip mode encoding as the encoding mode for the first macroblock further comprises a set of instructions for selecting skip mode encoding as the encoding mode for the first macroblock when the particular difference is within the third threshold.

24. The non-transitory computer readable medium of claim 21, wherein the computer program further comprises a set of instructions for determining whether a particular difference between a masking strength of the first macroblock and a masking strength of the second macroblock is within a third threshold, wherein the set of instructions for selecting skip mode encoding as the encoding mode for the first macroblock further comprises a set of instructions for selecting skip mode encoding as the encoding mode for the first macroblock when the particular difference is within the third threshold.

25. The non-transitory computer readable medium of claim 21, wherein the computer program further comprises a set of instructions for selecting interblock mode encoding as the encoding mode for the first macroblock when the angular difference is not within the first threshold.

26. The non-transitory computer readable medium of claim 21, wherein the computer program further comprises a set of instructions for selecting intrablock mode encoding as the encoding mode for the first macroblock when the angular difference is not within the first threshold.

* * * * *